US008713956B2

(12) United States Patent  (10) Patent No.: US 8,713,956 B2
Couto et al.  (45) Date of Patent: May 6, 2014

(54) REFRIGERATION SYSTEM FOR COMPACT EQUIPMENT

(75) Inventors: Paulo Rogerio Carrara Couto, Joinville-SC (BR); Guilherme Borges Ribeiro, Florianopolis-SC (BR)

(73) Assignees: Whirlpool S.A., Sao Paulo—SP (BR); Universidade Federal de Santa Catarina (UFSC), Autarquia Federal de Regime Especial, Florianopolis (BR)

( * ) Notice: Subject to any disclaimer, the term of this patent is extended or adjusted under 35 U.S.C. 154(b) by 282 days.

(21) Appl. No.: 13/262,338

(22) PCT Filed: Mar. 30, 2010

(86) PCT No.: PCT/BR2010/000112
§ 371 (c)(1),
(2), (4) Date: Nov. 28, 2011

(87) PCT Pub. No.: WO2010/111762
PCT Pub. Date: Oct. 7, 2010

(65) Prior Publication Data
US 2012/0090343 A1  Apr. 19, 2012

(51) Int. Cl.
*F25D 23/12* (2006.01)
*F28F 7/00* (2006.01)

(52) U.S. Cl.
USPC .................................. 62/259.2; 165/80.2

(58) Field of Classification Search
USPC ........ 62/259.2; 165/58, 80.2, 104.26, 104.33, 165/172; 361/700–702; 174/15.2
See application file for complete search history.

(56) References Cited

U.S. PATENT DOCUMENTS

| 5,437,844 | A | * | 8/1995 | Bonner | 422/186 |
| 5,781,409 | A | | 7/1998 | Mecredy, III | 361/687 |
| 6,052,285 | A | * | 4/2000 | Hileman | 361/699 |
| 6,084,769 | A | | 7/2000 | Moore et al. | 361/687 |
| 6,118,654 | A | | 9/2000 | Bhatia | 361/687 |
| 6,172,871 | B1 | | 1/2001 | Holung et al. | 361/687 |
| 6,313,987 | B1 | * | 11/2001 | O'Connor et al. | 361/679.46 |
| 6,415,612 | B1 | | 7/2002 | Pokharna et al. | 62/3.2 |
| 6,845,625 | B1 | | 1/2005 | Pokharna | 62/118 |
| 7,342,787 | B1 | * | 3/2008 | Bhatia | 361/700 |
| 2007/0089859 | A1 | * | 4/2007 | Wei | 165/80.4 |

FOREIGN PATENT DOCUMENTS

WO  WO 2004/051168 A2  6/2004

* cited by examiner

*Primary Examiner* — Judy Swann
*Assistant Examiner* — Christopher R Zerphey
(74) *Attorney, Agent, or Firm* — Harrington & Smith

(57) ABSTRACT

The present invention provides a refrigeration system for compact equipment, particularly of the type including electronic circuits and internally provided with a heat source to be cooled, said refrigeration system including a heat dissipation device mounted in the equipment and including a heat absorbing portion, which absorbs heat from the heat source, and a heat dissipation portion accessible from the outside of the equipment and which releases the heat to the exterior of the equipment; and an auxiliary refrigeration circuit external to the equipment and having: a heat absorbing means to be selectively coupled to the heat dissipation portion so as to receive therefrom, by conduction, at least part of the heat received from the heat source and dissipated by said heat dissipation portion; and a heat dissipation means which releases the heat to the environment external to the equipment.

13 Claims, 12 Drawing Sheets

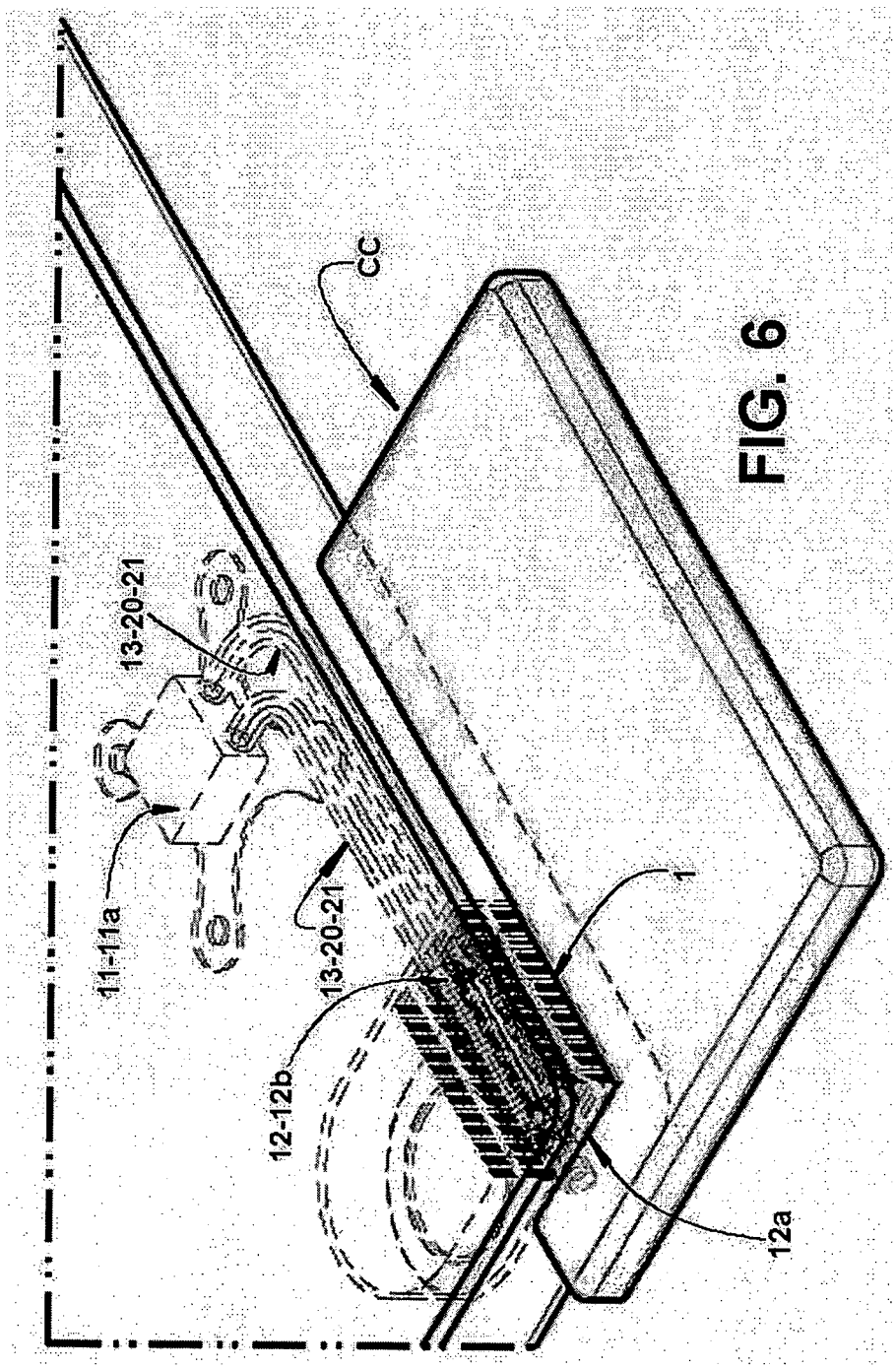

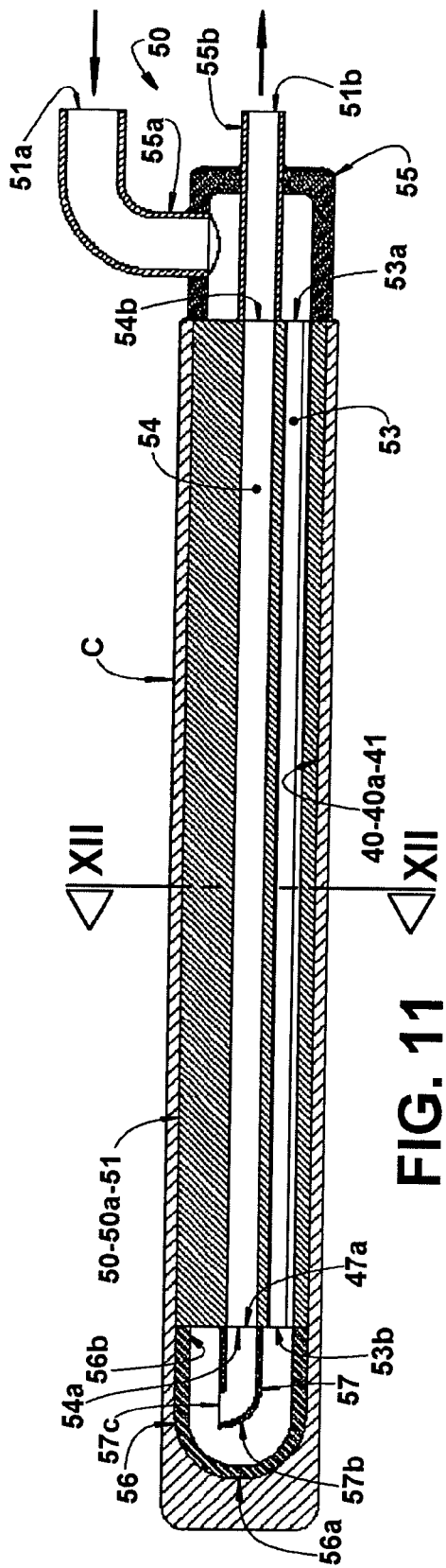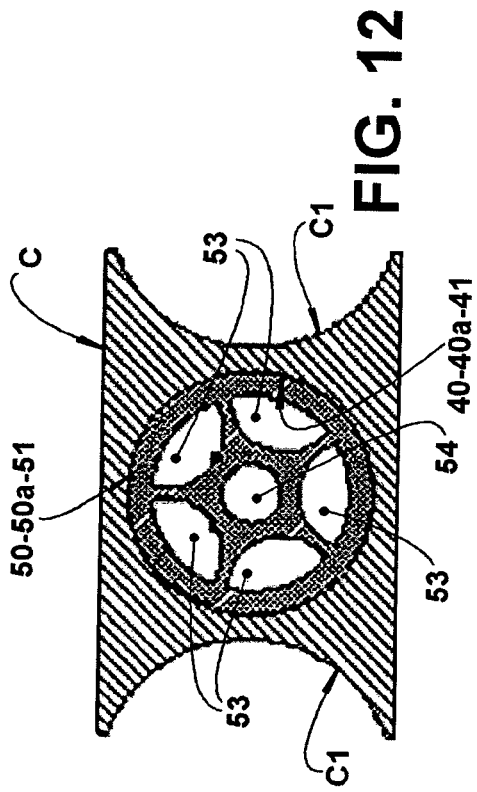

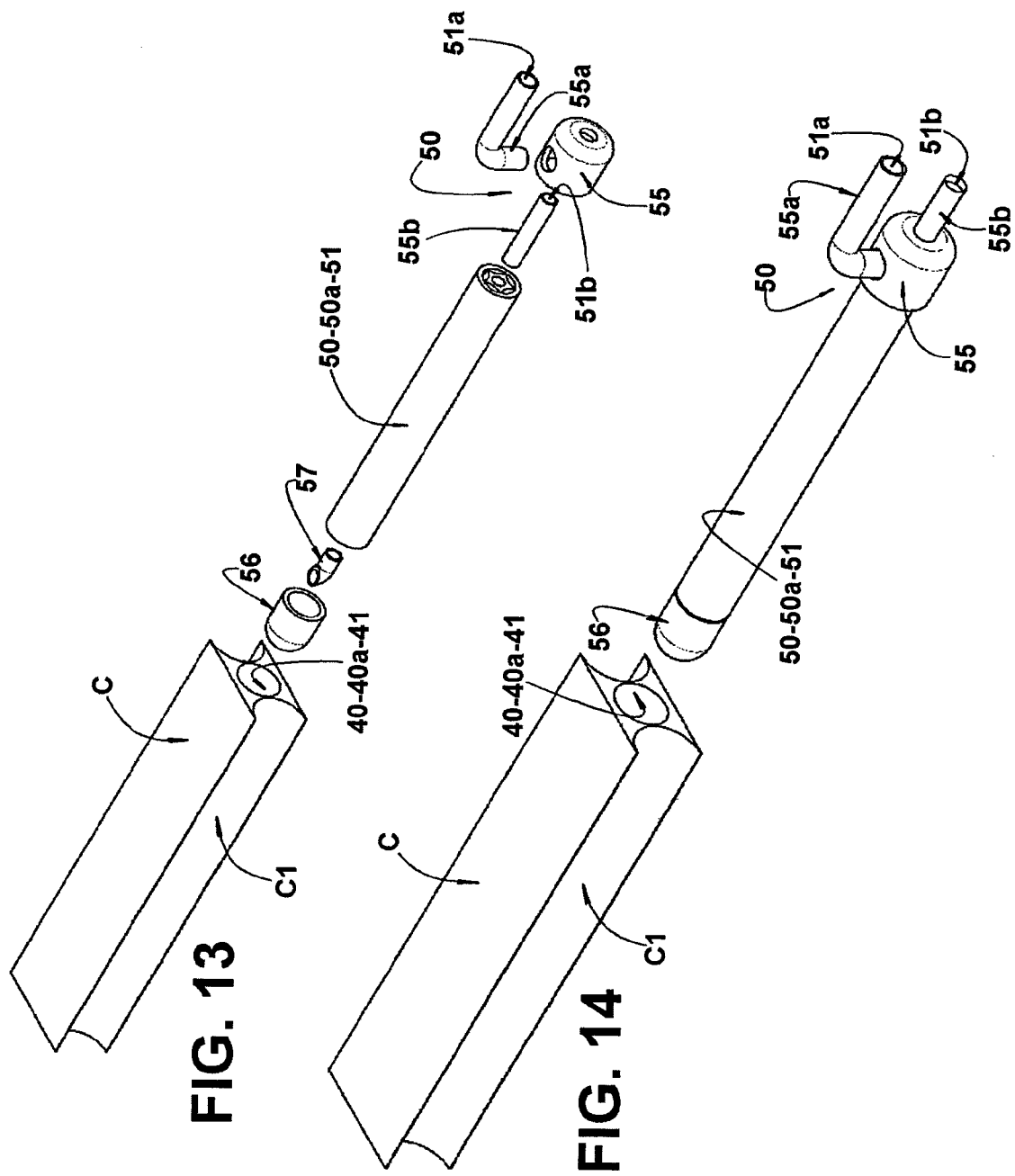

REFRIGERATION SYSTEM FOR COMPACT EQUIPMENT

FIELD OF THE INVENTION

The present invention refers to a refrigeration system for compact equipment, such as, for example, the equipment comprising electronic circuits and internally provided with a heat source to be cooled, said system, with reduced dimensions, comprising a heat dissipation device mounted in the equipment and including a heat absorbing portion disposed to absorb heat from the heat source, and a heat dissipation portion disposed to release the heat absorbed from the heat source to the environment external to the equipment.

The present refrigeration system is particularly adequate for cooling electronic components, such as microprocessors in general and integrated circuits used in compact electronic appliances, such as a laptop or notebook type computer, and the like.

BACKGROUND OF THE INVENTION

Electronic equipment in general, particularly computers, including the portable ones, such as laptops and notebooks, are typically formed by electric circuits and devices which, for a good functioning, require that their temperature be maintained within a certain temperature range, which is previously determined and mainly lower than its superior limit, in order to guarantee the operational properties thereof.

When carrying out a determined function, said electro-electronic devices transform part of the electric energy used for the operation into heat, noise, etc. This part of energy converted in thermal energy should preferably be withdrawn from the equipment, so as to allow its thermal management to be adequately carried out, providing greater levels of efficiency and reliability of the components, so that these components can operate in moderate temperature levels.

Traditionally, in said equipment, the electronic circuits are accommodated in a casing or cabinet for protection and assembly and, due to the space disposition of their components, many of the devices that generate heat are positioned in central regions that are difficult to access from the outside. In these cases, the electric device responsible for heat generation is located in the interior of the electronic equipment, and consequently, the generated thermal energy must be transferred to the external environment in which the equipment is operating. When the dissipation levels are low or moderate, it is traditionally provided finned dissipation devices positioned close to the heat source for increasing the area exposed to the air in the interior of the equipment and which is responsible for the dissipation of energy. This process may or may not be aided by forced ventilation, by installing fans in the dissipation device or in the cabinet itself. Independently of the location or of the presence of fans, the air available to absorb the heat from the dissipation device arrives at the device already previously heated by the other components of the electronic equipment, which also dissipate, in the form of heat, part of the energy used for their operation. This pre-heating reduces the efficiency of the process of transferring heat from the component desired to be cooled. In order to reduce this effect, the heat is usually efficiently conducted from the device to be cooled to a region close to the side of the equipment where the thermal energy can be absorbed by the air in the operational environment of the equipment without pre-heating. To said end, several components are provided to transport energy in an efficient manner. The known solutions for withdrawing heat from these components are based on passive devices as, for example: heat conduction in a solid medium, heat pipes, thermosiphons, liquid pumping circuits and refrigeration circuits by mechanical vapor compression (FIGS. 5 to 5d).

In all the embodiments presented, the dissipation device may or may not be housed in the interior of the equipment to be cooled. FIGS. 5 to 5d illustrate dissipation devices carried by the electronic equipment.

In the solutions presented in FIGS. 5 to 5d, the heat dissipation region is positioned in an outermost portion of the equipment, so as to facilitate removing the heat to the external environment. The efficiency in conducting the heat from its source to the environment external to the equipment can be obtained by a working fluid phase-change process, as it occurs in the solutions illustrated in FIGS. 5a, 5b and 5d, and by a high flow rate of a circulating working fluid which may or may not change phase and which is impelled by a circulation pump (FIG. 5c). Except in the mechanical vapor compression (FIG. 5d), the typically used working fluid is water. In the case of the heat-pipes (FIG. 5a) and thermosiphons (FIG. 5b), the confined working fluid is in equilibrium with a portion of the volume occupied by the fluid in the liquid phase and another portion occupied by the fluid in the gaseous phase. The liquid phase is directed to the region coupled to the heat source by gravitational orientation or by capillary effect provided by porous elements immersed in the liquid and gaseous phases, and changes phase as it removes energy from the heat source. After being vaporized, this working fluid in the gaseous phase migrates to the cold portion of the component, heat-pipe or thermosiphon, which is exposed to the external environment air, where the energy is dissipated. The heat removal causes again a phase change of the working fluid from the gaseous to the liquid phase, thus restarting the cycle.

In the fluid pumping circuit, the working fluid in the liquid phase is continuously impelled from the hot source to the cold portion of the circuit, transferring energy from the heat source to the external environment air through a high flow rate imposed by the propulsion device, usually a pump. The working fluid is then heated when in contact with the heat source and posteriorly cooled when exposed to the external environment air. While being a more efficient process than the one provided by a finned dissipation device positioned on the heat source, the fluid pumping is less efficient than the dissipation devices composed by heat-pipes and thermosiphons, once there is no phase change and the propulsion element consumes energy.

In one of the known prior art solutions which uses heat pipes (U.S. Pat. No. 7,116,552), heat removal from the heated region of the computer is carried out through a heat dissipation system presenting two refrigeration circuits of the passive type (heat-pipe), each formed by a respective heat pipe. In this construction, a first refrigeration circuit presents a first heat pipe having a first end attached to the heated region of the computer and a second end mounted in a heat exchange device which also houses a first end portion of a second heat pipe of a second refrigeration circuit, so that heat exchange between the second end of the first heat pipe and the first end portion of the second heat pipe occurs in said heat exchange device. In this construction, after heat is exchanged between the second end of the first heat pipe and the first end portion of the second heat pipe, in the heat exchange device, the heat is conducted away from the heated region of the computer, being then dissipated to the external environment.

While this construction can be applied to portable computers without compromising their available area, the heat transfer and heat dissipation which occur only by actuation of the capillary pump, are not as efficient as those obtained in the refrigeration systems using mechanical vapor compression.

In the technical solution which provides conduction of thermal energy using a refrigeration system by mechanical vapor compression, a working fluid in the gaseous phase and coming from an evaporator coupled to the heat source, is compressed in a compressor and directed to a condenser exposed to the external environment air. In this heat exchanger, called condenser, in which the working fluid in the gaseous phase returns to the liquid phase, the thermal energy is removed by the external environment air and the condensed working fluid is then directed to an expansion device responsible for reducing its pressure, so that it can be evaporated in the evaporator and, posteriorly, compressed by the compressor, completing the cycle. The fact that the working fluid presents two distinct pressures (low pressure in the evaporator and high pressure in the condenser), throughout the refrigeration cycle, allows the energy conduction process to occur with temperature variation and, thus, the electronic element can be cooled at temperature levels inferior to the ones found in any of the other alternatives, and even reach temperatures inferior to the external environment air temperature itself.

Nevertheless, the use of such refrigeration systems by mechanical vapor compression presents some barriers regarding not only the miniaturization of the compressor, but also the efficiency of the known evaporators, when their size is reduced to the usual dimensions of the processors, and the like.

Besides, in most systems available for the thermal management of electronic equipment, the cooling system carried by the equipment is dimensioned for one operational range, that is, for determined levels of energy to be removed during the operation of the equipment. For reasons of space and also of energetic consumption, such systems are not dimensioned to offer the highest efficiency during peaks of operation, since they occur in reduced time periods or with intermittent time intervals.

In the case of computers, mainly the portable ones, the cooling system is dimensioned for the normal operation of the equipment under low and moderate processing levels, as it occurs in operations of text editing, Internet browsing, image editing, and the like. When more severe levels of processing or frequency of overclocking operation are required, the cooling system does not operate satisfactorily and requires a higher refrigeration capacity.

SUMMARY OF THE INVENTION

It is an object of the present invention to provide a refrigeration system with reduced dimensions and which allows a selective and substantial increase of efficiency in removing the heat from the interior of compact equipment such as, for example, those provided with internal electronic circuits.

It is also an object of the present invention to provide a refrigeration system, as defined above and which has its refrigeration capacity selectively defined as a function of the thermal energy generated by the equipment in different operational conditions.

These and other objects of the present invention are attained by providing a refrigeration system for compact equipment, such as the equipment comprising electronic circuits and which are internally provided with a heat source to be cooled, said systems comprising: a heat dissipation device mounted in the equipment and including a heat absorbing portion disposed to absorb heat from the heat source, and a heat dissipation portion disposed to release the heat absorbed from the heat source to an environment external to the equipment, the heat dissipation portion being accessible through the exterior of the equipment.

The refrigeration system of the equipment further comprises an auxiliary refrigeration circuit, external to the equipment and having: a heat absorbing means to be selectively coupled to the heat dissipation portion, so as to receive therefrom, by conduction, at least part of the heat received from the heat source and to be dissipated by said heat dissipation portion; and a heat dissipation means to release the heat to the environment external to the equipment. The auxiliary refrigeration circuit can be, for example, of the type which uses a working fluid to provide the thermal connection between the heat absorbing means and heat dissipation means.

According to one aspect of the invention, the heat dissipation device can be defined by any of the refrigeration systems of the type: heat conduction in a solid medium, heat-pipe, thermosiphon, circulating fluid pumping and mechanical vapor compression, so as to transfer heat from the heat absorbing portion to the heat dissipation portion.

According to a way of carrying out the present invention, one of the parts of heat dissipation portion and heat absorbing means defines at least one heat exchange housing formed, at least in part, by a heat exchange wall, whilst the other of said parts comprises at least one plug element formed, at least in part, by an outer heat exchange surface, said plug being tightly removably fitted in the interior of a respective heat exchange housing, so as to provide the coupling of the heat absorbing means to the heat dissipation portion and to allow heat exchange, by conduction, to occur between the heat exchange wall and the outer heat exchange surface of said parts.

According to the construction cited above for the present invention, the heat exchange housing is an elongated hole, provided in a body made of a high thermal conductivity material and which is thermally coupled and carried by one of the parts of heat dissipation portion and heat absorbing means, the heat exchange wall of said elongated hole tightly surrounding and contacting the heat exchange surface of the plug element, when the latter is fitted in the interior of the elongated hole.

According to the invention, the compact equipment to be internally cooled may operate only with the heat dissipation device, when the heat exchange capacity of the latter is sufficient to maintain the equipment in an adequate temperature under determined operating regimes.

When the equipment operates in regimes that generate thermal energy in a level superior to the heat exchange capacity of the heat dissipation device, the auxiliary refrigeration circuit has its heat absorbing means physically and thermally coupled to the heat dissipation portion of the heat dissipation device, considerably increasing the capacity of the refrigeration system, allowing said system to maintain the equipment operating at an adequate temperature.

BRIEF DESCRIPTION OF THE DRAWINGS

The invention will be described below, with reference to the enclosed drawings, given by way of example of an embodiment of the invention and in which:

FIG. 6 represents a partial and schematic perspective view of a compact equipment carrying a heat dissipation device in the form of a heat pipe; and there is also illustrated a compact structural module, defining the auxiliary refrigeration circuit and coupled to the equipment;

FIG. 11 schematically represents a longitudinal sectional view of the plug element illustrated in FIGS. 3, 7, 9 and 10, said view taken along line XI-XI in FIG. 9;

FIG. 12 schematically represents a cross-sectional view of the plug element illustrated in FIGS. 3, 7, 9, 10 and 11, said view taken along line XII-XII in FIG. 11;

FIG. 13 schematically represents an exploded perspective view f the plug element; and FIG. 14 schematically represents a perspective view of the plug element of the previous figure and in a mounted condition, to be introduced in the housing defined by the elongated hole of the body made of high thermal conductivity material.

DESCRIPTION OF THE ILLUSTRATED EMBODIMENT

Figure 1:
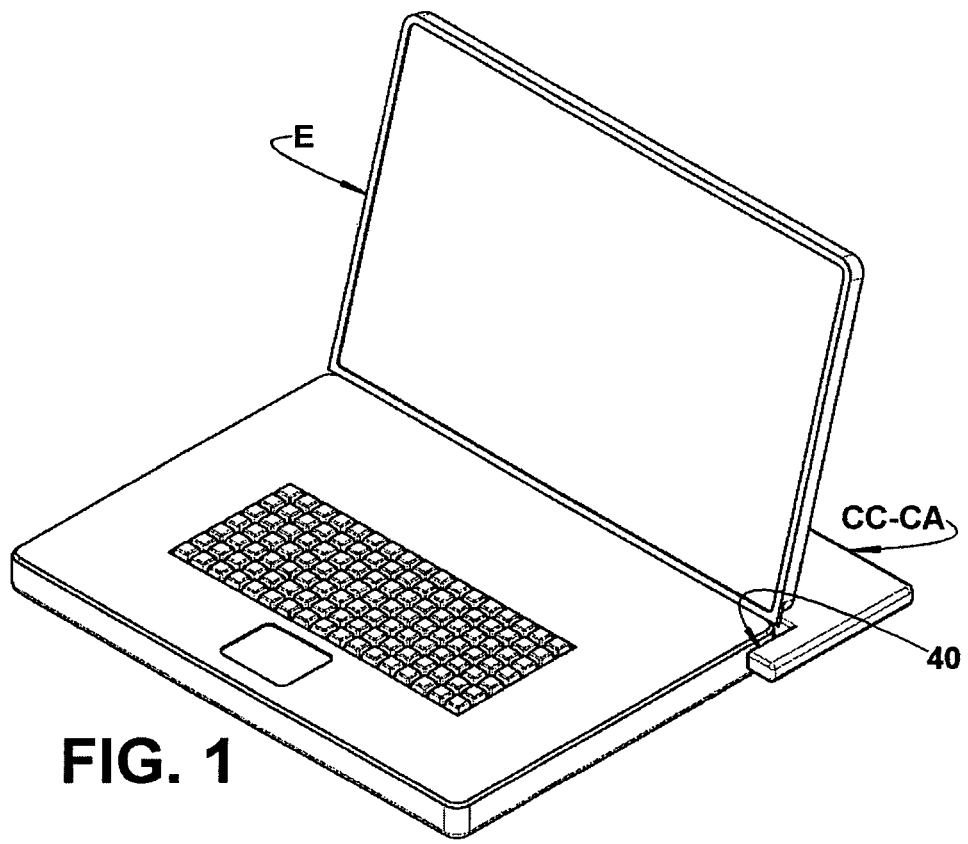
FIGS. 1 and 2 represent, respectively and schematically, a front perspective view and a rear perspective view of a compact equipment, internally provided with electronic circuits and with a heat dissipation device to which is coupled an auxiliary refrigeration circuit including the heat absorbing means and the heat dissipation means of the present invention.
Figure 2:
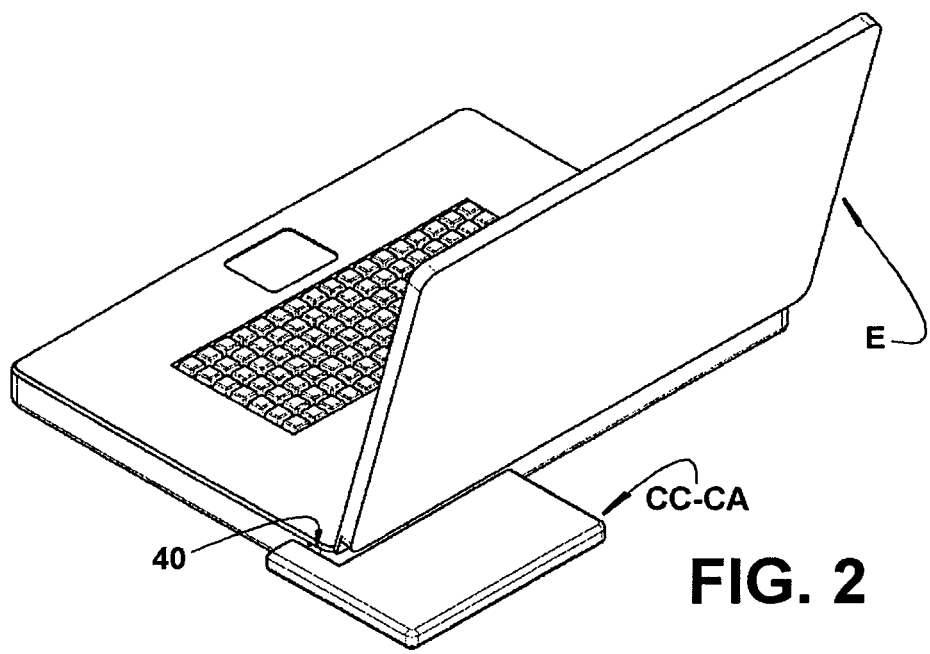
Figure 3:
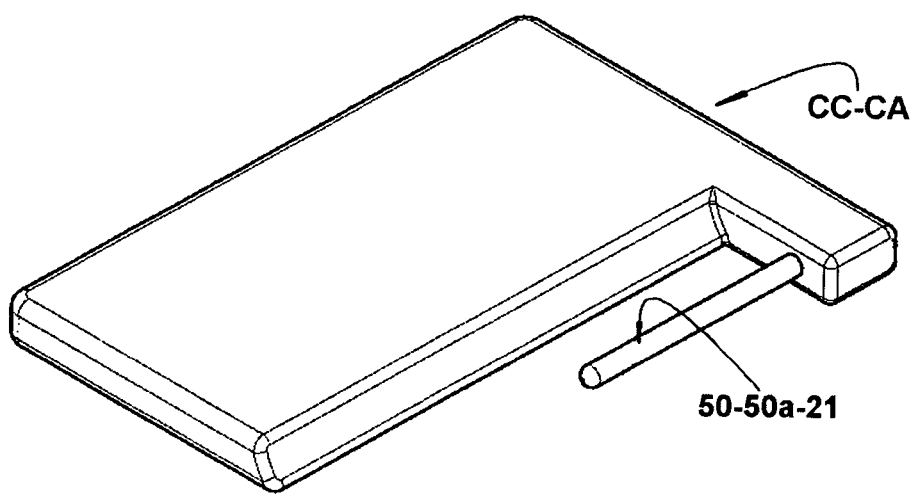
FIG. 3 schematically represents a perspective view of a compact structural module which defines the auxiliary refrigeration circuit of the present invention, said compact structural module not being coupled to the equipment of FIG. 1, to be internally cooled.

The refrigeration system of the present invention is applicable to compact equipment E generally presenting internal electronic circuits, as is the case of the microprocessors in general and integrated circuits which are used in compact electronic appliances, such as laptop or notebook type computer, and the like, and which define a heat source F to be cooled.

Such types of equipment E usually already present, in the interior thereof, a refrigeration system which operates by removing heat from a heat source F generally associated with the microprocessor of said equipment E, said heat being directed to an environment external to the equipment E through a fin system, with or without forced air ventilation.

For the cases in which it is necessary to increase the removal of heat from such equipment E, the present invention provides the selective and removable coupling of an auxiliary refrigeration circuit, to be described ahead.

The refrigeration system of the present invention comprises a heat dissipation device 10 mounted in the interior of the equipment E, and an auxiliary refrigeration circuit CA external to the equipment E and having a heat absorbing means 20 which is externally and selectively coupled to the heat dissipation device 10 so as to receive therefrom, by conduction, at least part of the heat generated by the heat source F, and a heat dissipation means 30 to release said heat to the environment external to the equipment E. The transmission of heat by conduction occurs in the regions in which there is contact between the parts of heat dissipation device 10 and heat absorbing means 20, as described ahead.

The heat dissipation device 10 includes a heat absorbing portion 11 disposed to absorb heat from the heat source F, and a heat dissipation portion 12, which is accessible through the exterior of the equipment E and disposed to release the heat absorbed from the heat source F to an environment external to the equipment E. The heat absorbing means 20 is selectively coupled to the heat dissipation portion 12 so as to receive therefrom, by conduction, at least part of the heat received from the heat source F and to be dissipated by said heat dissipation portion 12.

Figure 5:
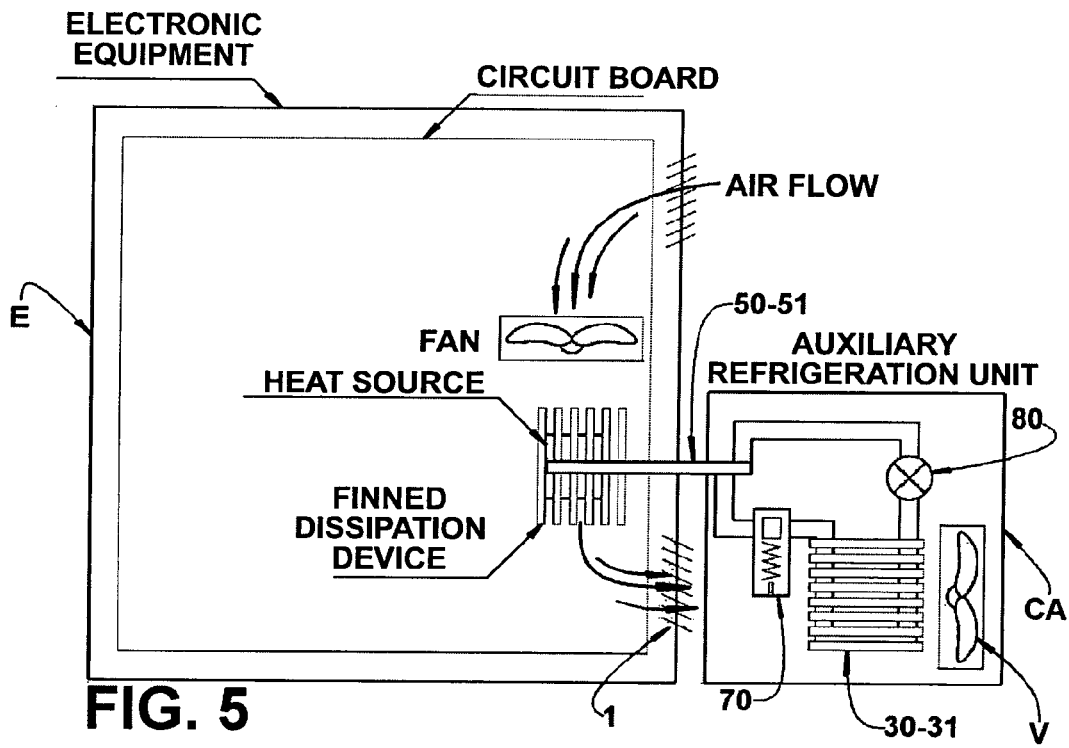
FIGS. 5, 5a, 5b, 5c and 5d schematically represent a compact equipment internally provided with electronic circuits which define a heat source, and with different heat dissipation devices respectively defined by a heat conduction system in a solid medium, a heat pipe, a thermosiphon; a circulating fluid pumping and a mechanical vapor compression system.
Figure 5A:
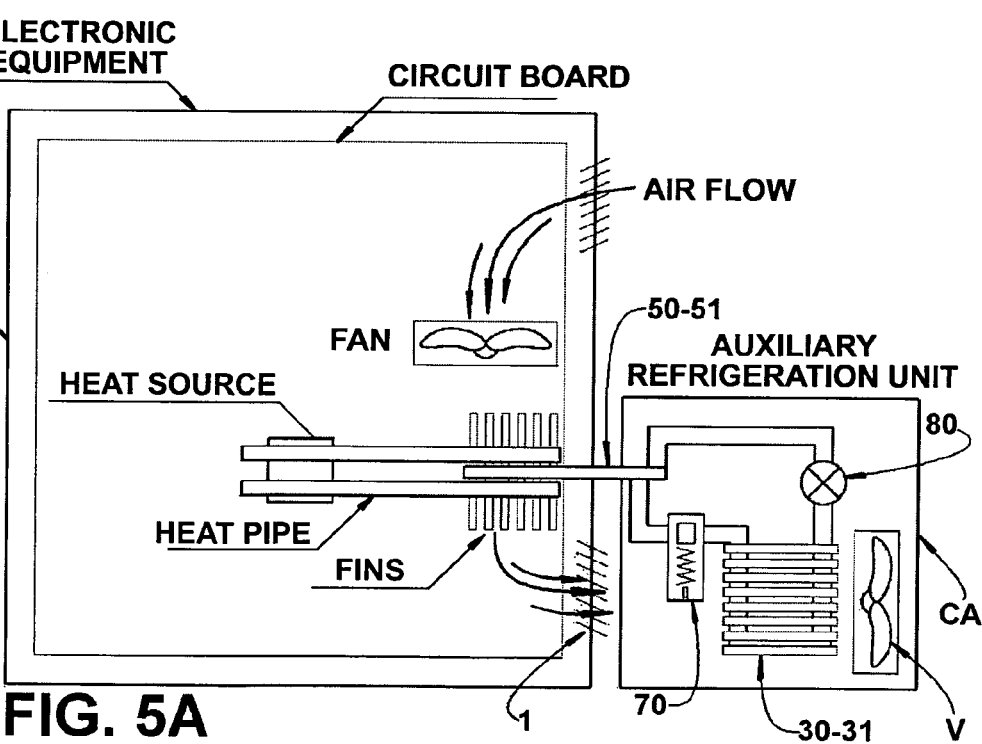
Figure 5B:
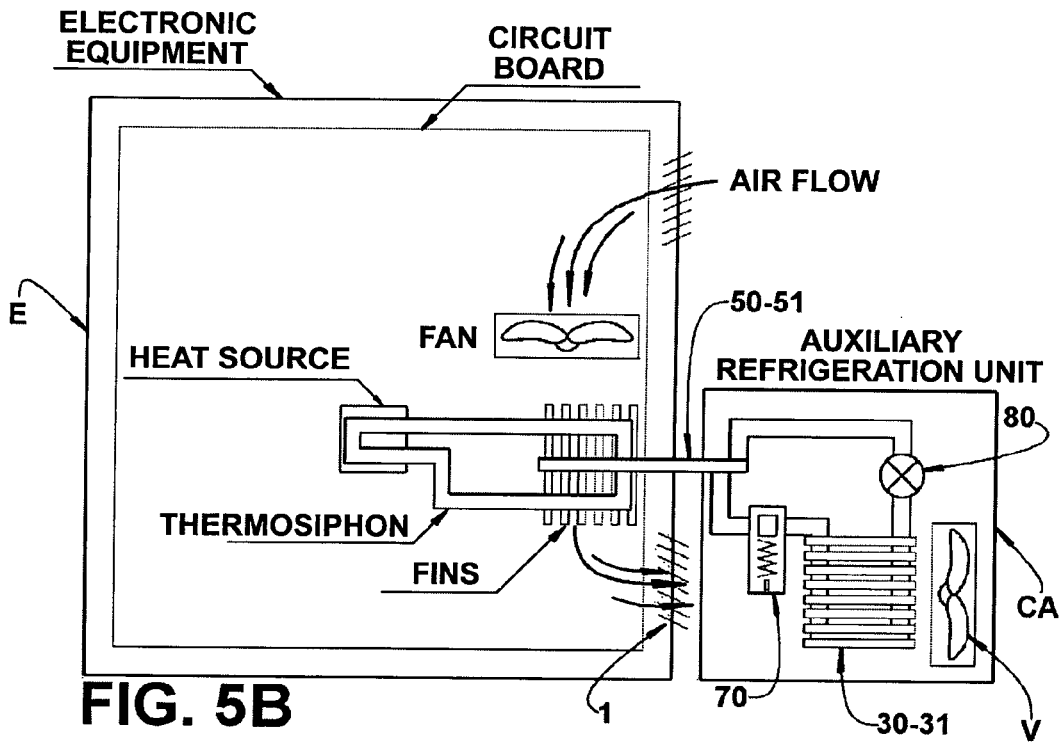
Figure 5C:
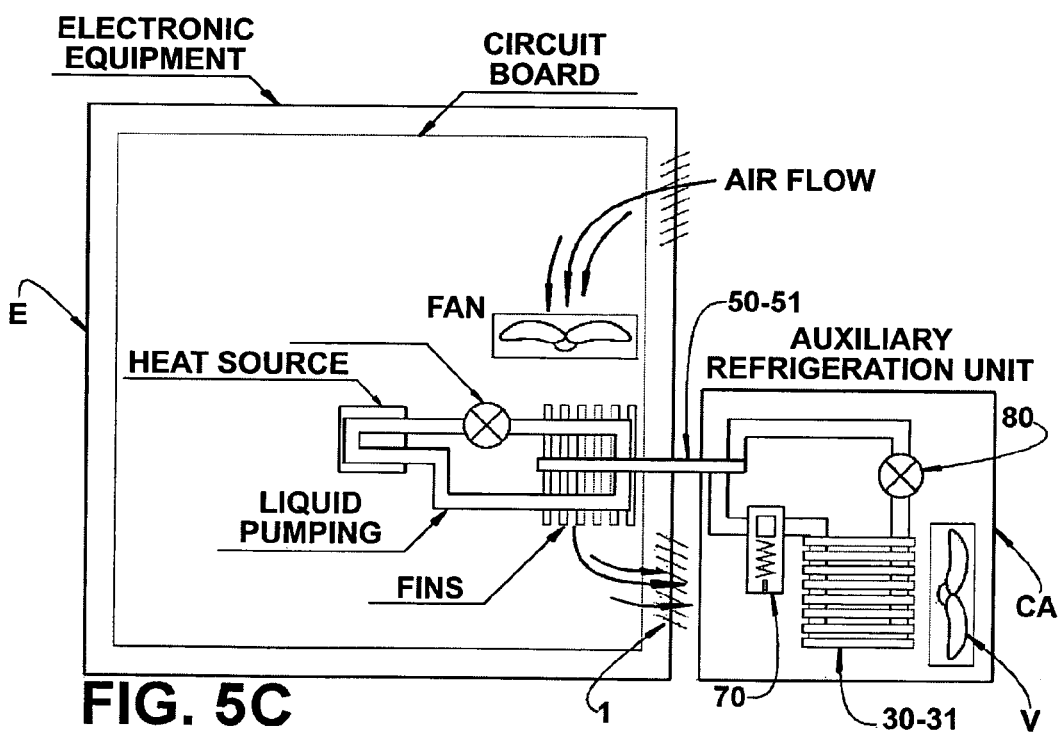
Figure 5D:
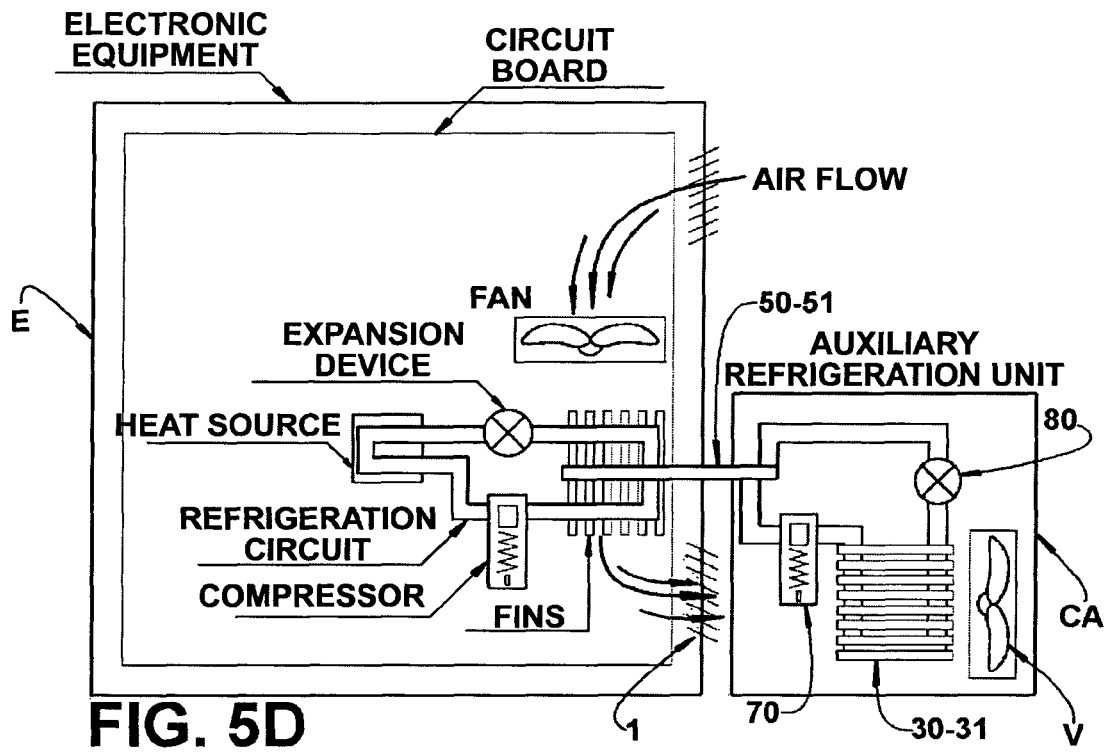
Figure 7:
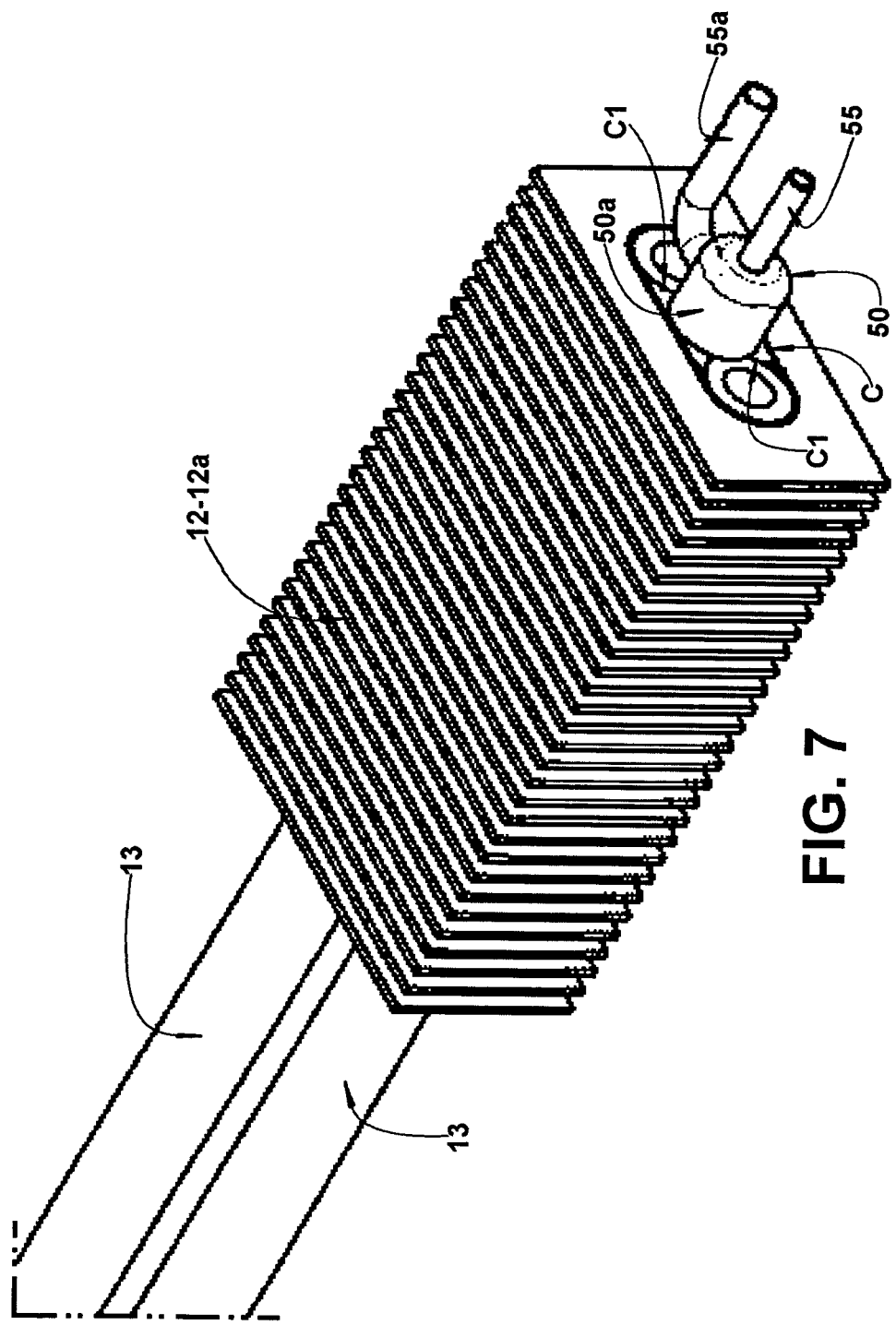
FIG. 7 represents a perspective view of the heat dissipation portion illustrated in the equipment partially represented in FIG. 6 and inside which is housed and thermally connected the heat absorbing means of the auxiliary refrigeration circuit.
Figure 8:
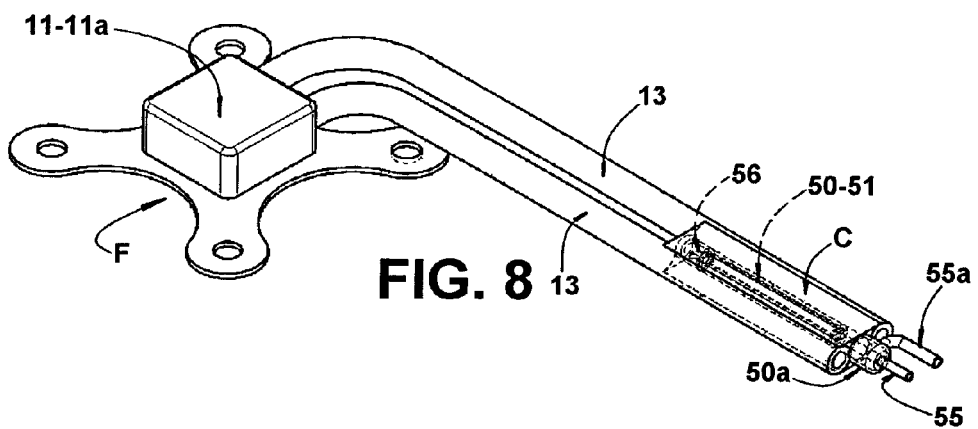
FIG. 8 is a perspective view of the heat dissipation device in the form of a heat pipe, in whose heat dissipation portion is housed the heat absorbing means, in the form of a plug element of the auxiliary refrigeration circuit.
Figure 9:
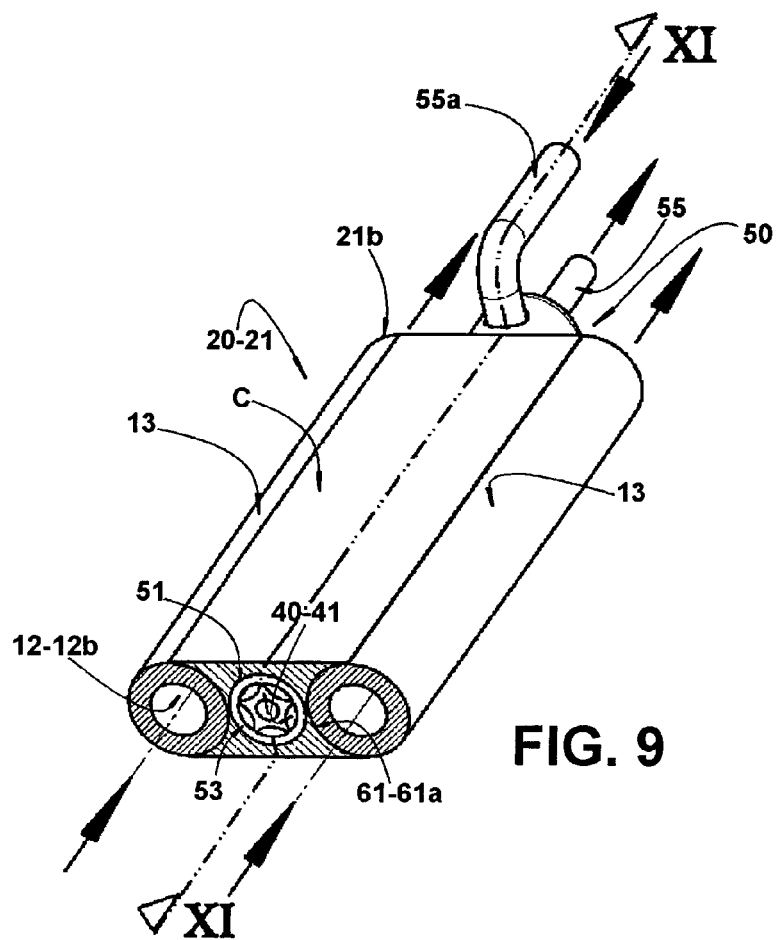
FIG. 9 represents, somewhat schematically, a partially sectioned perspective view of the body made of a high thermal conductivity material, in whose elongated hole is defined the fitting housing of the plug element illustrated in FIG. 8, said body presenting a pair of cradles for the working fluid ducts of the heat dissipation device.
Figure 10:
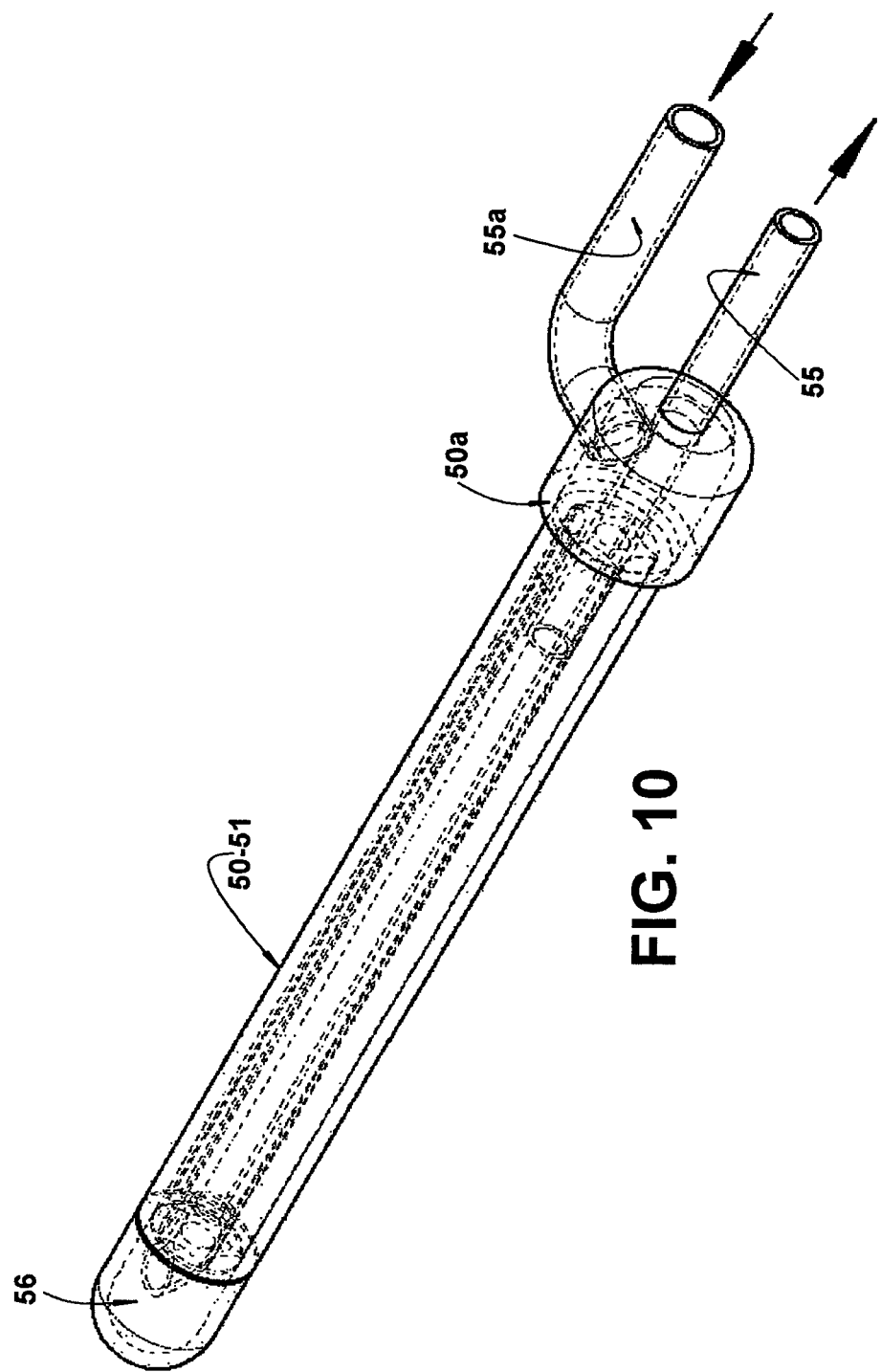
FIG. 10 represents, schematically and in a perspective view, a construction for the plug element of the present invention.

According to the present invention, the heat dissipation device 10 can be defined by any of the refrigeration systems of the type: heat conduction in a solid medium (FIG. 5), heat-pipe (FIG. 5a), thermosiphon (FIG. 5b), circulating fluid pumping (FIG. 5c) and mechanical vapor compression (FIG. 5d), to transfer heat from the heat absorbing portion 11 to the heat dissipation portion 12.

The heat dissipated by the heat dissipation portion 12 and not absorbed by the heat absorbing means 20 is dissipated, to the environment external to the equipment E, by at least one of the thermal energy transfer modes defined by radiation, by natural convection and by forced air-flow convection.

Figure 4:
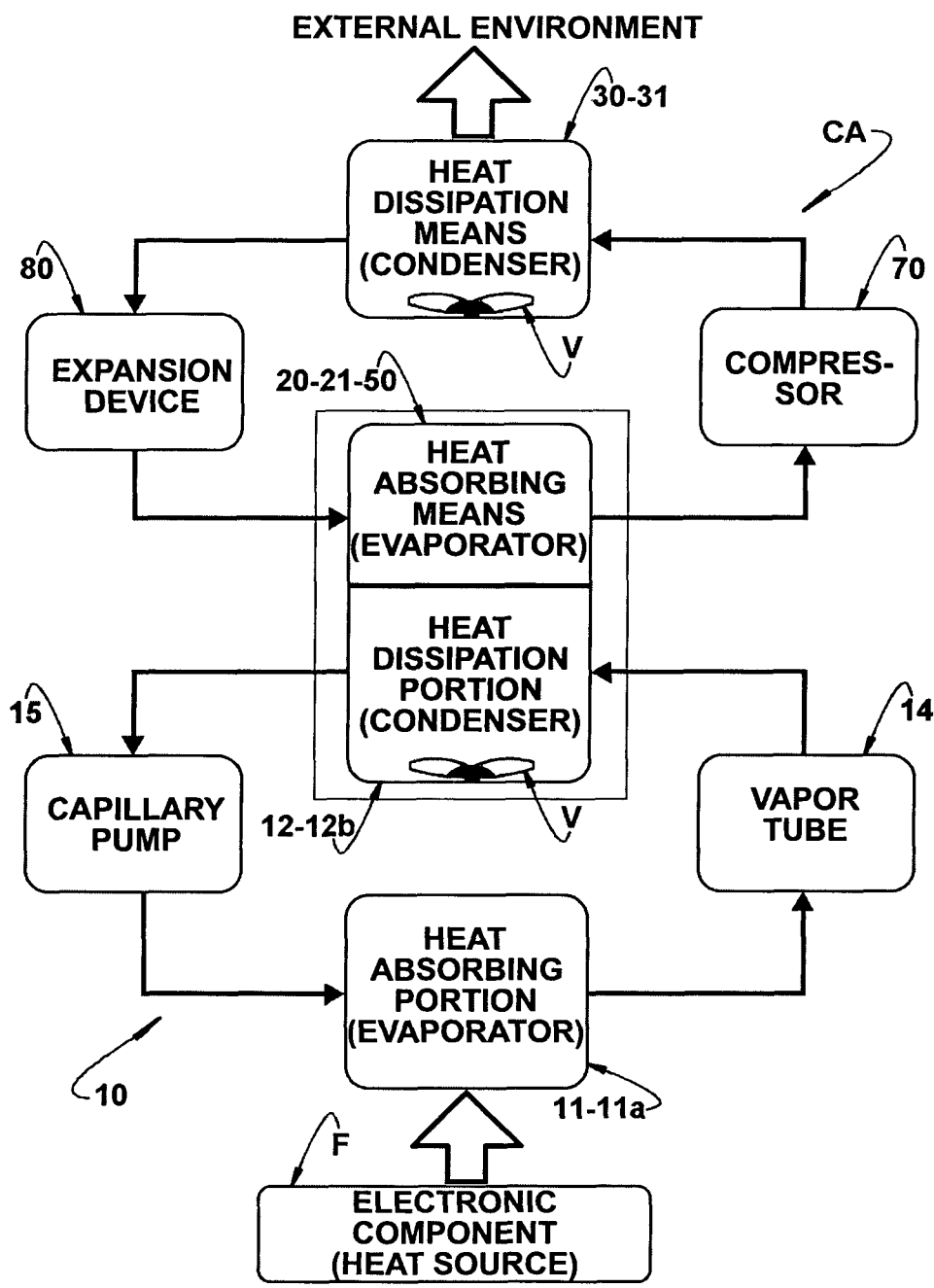
FIG. 4 represents, in a block diagram, the refrigeration system of the present invention when formed by an auxiliary refrigeration circuit of the type using mechanical vapor compression and which is thermally and physically connected to a heat dissipation device internal to the equipment to be cooled and of the heat-pipe type.

In a particular form of construction, the equipment E is internally provided with a fan V (FIGS. 4 and 5 to 5d) of any known type, in order to dissipate, to the external environment and by forced air-flow convection, the heat not absorbed by the heat absorbing means 20.

The equipment E can further comprise at least one window 1 (FIGS. 1, 2, 5 to 5d and 6) open outwards from the peripheral contour of said equipment E and adjacent to which fins 12a are provided, incorporated to the heat dissipation portion 12, the fan V forcing the passage of air flow through the fins 12a, towards the window 1 and to the environment external to the equipment E. In the construction illustrated in FIG. 6, the equipment E comprises an air-intake window (not illustrated), inferiorly disposed in said equipment E, and a window 1, laterally and posteriorly provided in the equipment E, and which defines an exhaust opening through which the natural or forced air-flow carrying heat from the heat dissipation portion 12 is directed to the outside of the equipment E.

According to the present invention, and independently of the construction of the heat dissipation device 10 and of the heat absorbing means 20, one of the parts of heat dissipation portion 12 and heat absorbing means 20 defines at least one heat exchange housing 40 formed, at least in part, by a heat exchange wall 40a, whilst the other of said parts comprises at least one plug element 50 formed, at least in part, by an outer heat exchange surface 50a, said plug element 50 being tightly removably fitted in the interior of a respective heat exchange housing 40, so as to provide the coupling of the heat absorbing means 20 to the heat dissipation portion 12 and to allow the heat exchange to be carried out, by conduction, between the heat exchange wall 40a of the heat exchange housing 40 and the outer heat exchange surface 50a of the plug element 50.

In a particular form of the present invention, in which a substantial part of the heat received by the heat dissipation portion 12 is transferred, by conduction, to the heat absorbing means 20, the heat exchange housing 40 presents its whole inner wall in a thermal conducting material, and the whole outer surface of the heat absorbing means 20 is also defined in a thermal conducting material preferably with a heat conduction capacity similar to that of the material which forms the heat exchange housing 40. In this construction, the plug element 50 is completely surrounded by the heat exchange housing 40, so that the outer heat exchange surface 50a of the plug element 50 is seated against the inner wall of the heat exchange housing 40. For allowing this seating to be fully accomplished, the heat exchange housing 40 and the plug element 50 present cross sections with the same shape, to allow tightly fitting the plug element 50 in the interior of the heat exchange housing 40.

According to the present invention, the plug element 50 is introduced, for example, by sliding, in the interior of the heat exchange housing 40, until a substantial part or the whole length of the plug element 50 is surrounded by the elongated hole 41. The pressure increase during the operation of the refrigeration system described herein generates a deformation of the connected parts of plug element 50 and heat exchange housing 40, increasing the interference between said parts, retaining them mutually fitted and increasing the heat exchange contact.

It should be understood that the aspects described herein regarding the constructive and operational characteristics of the plug element 50 and of the heat exchange housing 40 do not depend on the fact that these elements are associated with the heat exchange device or with the auxiliary refrigeration circuit.

According to the present invention, the heat exchange housing 40 has the form of an elongated hole 41, provided in a body C made of a high thermal conductivity material and which is thermally coupled and carried by one of the parts of heat dissipation portion 12 and heat absorbing means 20, the heat exchange wall of said elongated hole 41 tightly surrounding and contacting the heat exchange surface 50a of the plug element 50, when the latter is fitted in the interior of the elongated hole 41.

The plug element 50 is defined by a refrigerant fluid tube 51 having an inlet end 51a and an outlet end 51b and comprises, longitudinally and internally, a plurality of peripheral channels 53 and a central channel 54, a first end 53a of the peripheral channels being connected to the inlet end 51a of the refrigerant fluid tube 51, whilst a second end 53b of the peripheral channels 53 is open to a first end 54a of the central channel 54, the second end 54b of the central channel 54 being open to the outlet end 51b of the refrigerant fluid tube 51.

The plug element 50 can have its inner channels presenting different forms, defined by fins mounted in the interior of the tube which defines said plug element 50, or also through a grooved tube or an extruded tube in which the longitudinal channels are obtained during the extrusion of the tube which defines the plug element 50.

In the illustrated construction, the first end 53a of each one of the peripheral channels 53 is open to the interior of a tubular head 55 attached to the body C and presenting a nozzle 55a which defines the inlet end 51a of the refrigerant fluid tube 51. The tubular head 55 is constructed in any adequate material, which can be hermetically and easily affixed to the refrigerant fluid tube 51, for example, by welding.

According to the present invention, the second end 54b of the central channel 54 projects through the tubular head 55, outwardly from the latter. In the illustrated construction, the tubular head 55 carries the nozzle 55a radially disposed and also a central duct 55b, communicating, tightly in relation to the interior of the tubular head 55, the second end 54b of the central channel 54 with the exterior of said tubular head 55, so as to define the outlet end 51b of the refrigerant fluid tube 51.

According to the present invention, the second end 53b of each peripheral channel 53 is preferably open to the interior of a portion of tubular casing 56, with a closed end 56a and an open end 56b, said tubular casing 56 being surrounded by a closed end portion of the body C.

In a way of carrying out the present invention, the tubular casing 56 has its open end 56b hermetically affixed to the refrigerant fluid tube 51, close to the region of the latter in which the second ends 53b of the peripheral channels 53 are defined, for example, before mounting said refrigerant fluid tube 51 in the interior of a longitudinal hole of the body C which defines the heat exchange housing 40. In the illustrated construction, the tubular casing 56 is seated against an inner surface of the body C, with a profile coincident with that of said tubular casing 56. The fixations of the parts which define the refrigerant fluid tube 51 are obtained, for example, by sealing gaskets.

According to the present invention, one of the parts of tubular casing 56 and central channel 54 carries an axial tubular hub 57 having a first end 57a connected to the first end 54a of the central channel 54 and a second end 57b provided with a radial opening 57c turned to the interior of the tubular casing 56.

In a way of carrying out the present invention, the tubular casing 56 can internally incorporate, in a single piece, the axial tubular hub 57. However, in the embodiment illustrated herein, the axial tubular hub 57 is attached to the central channel 54, before mounting the tubular casing 56 to the refrigerant fluid tube 51. The tubular casing 56 allows retaining refrigerant fluid in the liquid state, in order to prevent the liquid fluid from being admitted into the compression chamber of the refrigeration system.

According to the present invention, the auxiliary refrigeration circuit CA of the present refrigeration system, can be defined by any of the refrigeration systems of the type: heat conduction in a solid medium, heat-pipe, thermosiphon, circulating fluid pumping and mechanical vapor compression, to transfer heat from the heat absorbing means 20 to the heat dissipation means 30. It should be understood that the concept of the selective and removable coupling presented herein for fitting an auxiliary refrigeration circuit CA to be used in the operation of removing heat in an equipment E does not depend on the type of construction of each of the parts of heat dissipation device 10 and auxiliary refrigeration circuit CA, and that the removal of heat from the equipment E can be carried out by coupling equal parts, parts of the same type, or distinct parts.

As illustrated in FIGS. 1, 2, 3 and 6, the auxiliary refrigeration circuit CA can be provided in the interior of a compact casing CC which carries, externally projecting from a portion of it extension, the plug element 50, in the form of a cylindrical pin (illustrated embodiment), a conical pin or a flat pin. As illustrated herein, the plug element 50 is fitted into an elongated hole 41, open to the exterior of the body of the equipment E, through one of its side walls and through which the casing CC of the auxiliary refrigeration circuit CA is coupled to the equipment E. In the illustrated construction, the mounting of the casing CC of the auxiliary refrigeration circuit CA is made so as not to obstruct the window 1 for exhaustion of hot air from the equipment E. To this end, the adjacent portion of the casing CC is disposed slightly spaced from the direct contact with the wall of the equipment E in which at least one window 1 is provided. It should be understood that, besides this constructive arrangement illustrated for the casing CC, other embodiments are possible, such as an elongated casing CC disposed adjacently to a single side of the equipment E. The dimensioning of the casing CC of the auxiliary refrigeration circuit CA is preferably, but not mandatorily defined so as not to go beyond the contour of the equipment E.

In a preferred way of carrying out the invention, the auxiliary refrigeration circuit CA is a refrigeration circuit containing a working fluid to thermally connect the heat absorbing means 20 to the heat dissipation means 30. In particular, the auxiliary refrigeration circuit CA uses a working fluid in the form of a refrigerant fluid.

Among the possible constructive forms for the auxiliary refrigeration circuit CA, the one by mechanical vapor compression (FIGS. 4, 5 to 5d) presents a higher refrigeration efficiency, being the most indicated for using selective coupling close to an equipment E of the type considered herein. The use of circuits with mechanical vapor compression for the selective and complementary refrigeration of equipment of the type considered herein is only possible with the miniaturization of the refrigeration circuits to be used, particularly the miniaturization of the compressing unit, for example, such as that described in co-pending Brazilian patent applications of the same applicant PCT/BR06/000246 and PCT/BR07/00098, as well as of the evaporating unit, as described herein.

In the preferred and illustrated constructive form, the auxiliary refrigeration circuit CA of the present invention is a refrigeration circuit by mechanical vapor compression, of the type which uses a circulating working fluid, such as a refrigerant fluid.

In the illustrated embodiment, the auxiliary refrigeration circuit CA is a refrigeration circuit by mechanical compression of a refrigerant fluid, including: a compressor 70; a condenser 31 defining the heat dissipation means 30, receiving refrigerant fluid from the compressor 70 and releasing it to an expansion device 80 and, subsequently, to an evaporator 21 defined by the plug element 50 of the heat absorbing means 20.

According to a way of carrying out the present invention, the body C in a high thermal conductivity material is thermally connected to the heat source F, through at least one heat conduct 13 containing circulating fluid.

In the constructive form of the invention illustrated in FIGS. 4, 7, 8 and 9, the heat dissipation device is defined by a primary refrigeration circuit, through heat pipes, comprising a primary evaporator 11a which defines the heat absorbing portion 11, and a primary condenser 12b, defined by at least one heat conduct 13 of the heat dissipation portion 12, said heat conduct 13 receiving, by an inlet end 13a, a circulating fluid vaporized in the primary evaporator 11a, and releasing, in an outlet end 13b and back to the primary evaporator 11a, the condensed circulating fluid. In this construction, the inlet and outlet ends of the heat conduct 13 define, respectively, the working fluid inlet and outlet of the primary condenser 12b. For this construction, the heat dissipation portion 12 is thermally coupled to the heat absorbing portion 11, by at least one heat conduct 13.

According to the present invention, the body C is provided with at least one cradle C1 presenting a thermal contact surface against which a corresponding portion of the outer surface of the heat conduct 13 is seated and retained. In the illustrated construction, the body C presents a pair of cradles C1, which are spaced from each other and from the elongated hole 41 by portions of the body C. In the illustrated particular form (FIGS. 7, 8, 9, 12, 13 and 14), the cradles C1 are defined by respective elongated channels C1a, provided laterally to the elongated hole 41 which defines the heat exchange housing 40.

The cradles C1 are conformed so that the elongated channels C1a present the same peripheral contour as that of the portion of the heat conduct 13 to be seated and housed thereon, so as to optimize the thermal contact and transfer between the surfaces of body C and heat conduct 13.

The body C is, for example, constructed in a high thermal conductivity material, such as, for example, copper or aluminum, and which, besides permitting a structural coupling between the parts of refrigerant fluid tube 51 and heat conduct 13, facilitates the thermal exchange, by conduction, between said parts.

The refrigeration circuit through heat conducts 13 illustrated in FIGS. 5, 8, 9 and 10 further comprises a vapor tube 14 and a capillary pump 15, said vapor tube 14 receiving working fluid from the primary evaporator 11a, and releasing the vaporized working fluid to the duct of the primary condenser 12b. The capillary pump 15 receives the condensed working fluid, coming from the duct outlet end of the primary condenser 12b, conducting said working fluid to the primary evaporator 11a.

In this refrigeration circuit through heat conducts 13, the fluid communication between the components occurs through conventional conducts, the primary evaporator 11a and the primary condenser 12b being constructed in the form of heat exchangers of the heat pipe type, in which the change of the working fluid state is carried out.

The refrigeration circuit by mechanical compression of a refrigerant fluid is similar to that of household refrigeration systems applied to refrigerators or air conditioners, but miniaturized for use in small refrigeration systems, particularly for application in electronic devices, such as those used in computers, for example, of the portable type.

In these refrigeration circuits of reduced size, the compressor can be of the linear type and, preferably, with variable speed (VCC), to permit an automatic adjustment of the refrigeration to be produced for cooling the component or electronic device. The compressor linear is, for example, of the type described in Brazilian patent applications PCT/BR06/000246 and PCT/BR07/000098.

Nevertheless, it should be understood that the claimed dissipation systems described herein is not limited to the type of computer, neither to the type of motor or compressor presented as examples.

In the refrigeration circuit by mechanical compression of a refrigerant fluid, the compressor 70 pumps refrigerant fluid, through a refrigeration closed circuit, to the condenser 31.

With this construction, the heat removed from the primary condenser 12b, by the refrigerant fluid passing through the evaporator 21 of the auxiliary refrigeration circuit CA, is released to the atmosphere upon reaching the condenser 31 of said auxiliary refrigeration circuit CA.

According to the present invention, the plug element 50 which defines the evaporator 20 includes a refrigerant fluid tube 51 having an inlet end 51a coupled to the condenser outlet 31, through the expansion device 80, and an outlet end 51b coupled to the suction of the compressor 70. The inlet end 51a and outlet end 51b of the refrigerant fluid tube 51 define, respectively, the admission and exit of refrigerant fluid in relation to the evaporator 21.

According to an illustrated constructive form, the refrigerant fluid tube 51 of the evaporator 21 is cylindrical, and it can be smooth, grooved, extruded, with or without fins. Said refrigerant fluid tube can be also conical or flat and externally provided with a thread to be fitted and retained to the heat dissipation device 12. In order to provide a high heat transfer between the refrigerant fluid tube 51 and heat conduct 13, said tube and said conduct and also the body C must be brazed.

Although not illustrated, each cradle C1 can have also the form of a hole provided throughout the length of the body C, such as the form of the heat exchange housing 40. Nevertheless, such constructive option not only makes the mounting of the heat conducts 13 difficult, but also requires a larger mounting area, which is not always available in electronic circuits.

During the operation of the compressor, the condensed refrigerant fluid that reaches the refrigerant fluid tube 51 through the peripheral channels 53, is vaporized, by heat exchange with the vaporized working fluid passing through the heat conducts 13 of the primary condenser 12b, to be then directed through the axial radial opening 57c of the axial tubular hub 57 and through the central channel 54, to be drawn by the compressor 70 of the refrigeration circuit by mechanical compression of refrigerant fluid and conducted to the condenser 31, to release, to the atmosphere, the heat removed from the heat source F provided in the interior of the equipment E. The condensed refrigerant fluid, which reaches the refrigerant fluid tube 51, passes through the peripheral channels 53, in which the phase change of said refrigerant fluid occurs, in the opposite direction to that upon passing through the central channel 54, being then directed to the suction of the compressor 70. After the evaporation, the refrigerant fluid returns through the central channel 54, until reaching its outlet which is turned to the suction of the compressor 70.

The solution described and illustrated herein allows only the evaporator 21 to be introduced within the environment in which is found the heat source F of a portable computer, for example. The other components, such as the compressor 70 and the expansion device 80, are mounted externally to said computer or other device that defines a type of compact equipment to which the present invention is applied.

The refrigeration system proposed herein allows, in occasional situations in which extra refrigeration is required in equipment E of the type considered herein, such as portable computers, the additional coupling of a refrigeration system which will be used to provide a higher refrigeration capacity for the equipment, said coupled refrigeration system being an independent and portable refrigeration system. Thus, the equipment under normal operation conditions is cooled by its internal refrigeration system and, whenever high levels of heat are generated (for example, when playing games on computers), the auxiliary refrigeration system proposed herein is used.

For any configuration for the evaporator of the auxiliary refrigeration circuit, the heat exchange housing is conceived to receive said evaporator so as to enable said auxiliary refrigeration circuit to be easy mounted and dismounted, either by sliding or by threading of cylindrical, conical or flat surfaces.

Besides, for some operational conditions, for example, high evaporation temperatures, the increase of the evaporator diameter can be purposely provided by increasing the inner evaporation pressure and, therefore, the elastic radial deformation of the evaporator can be used to improve its thermal contact with the heat exchange housing of the refrigeration system of the present electronic equipment, and also to better affix said evaporator into the interior of the heat exchange housing.

As presented in the enclosed drawings, the auxiliary refrigeration circuit of the refrigeration system of the present invention presents a reduced size, with an evaporator especially designed to provide an easy coupling, of the "plug and play" type, to the electronic equipment in which a higher refrigeration capacity is desired. Since it is compact and easily operated, the refrigeration system of the present invention can be coupled to any of the cooling devices already known and usually provided in an equipment of the type described herein.

The refrigeration system object of the present solution can present one or more evaporators, a compressor, a condenser and an expansion device which are arranged so as to operate in a refrigeration cycle by mechanical vapor compression.

The evaporator of the auxiliary refrigeration circuit object of the present invention can present different geometries, besides those illustrated herein, as well as different forms of coupling said evaporator of the auxiliary refrigeration circuit to the condenser of the refrigeration system internal to the equipment E. Different forms of obtaining the inner channels of the evaporator are also possible, besides that described and illustrated herein.

Preferably, the evaporator presents a cylindrical shape with inner channels defined to direct the working fluid in the liquid and gaseous phases. However, it should be understood that other external coupling forms are also possible.

In all the presented embodiments, the inner channels are disposed so that the working fluid in the liquid phase is directed to the outer channels, to absorb the energy from the dissipation device, changing phase and returning in the gaseous phase through the inner channels.

Besides the external form of the evaporator, the inner channels of the cylindrical evaporator can be obtained in several forms, as illustrated.

The invention claimed is:

1. A refrigeration system for compact equipment comprising electronic circuits and internally provided with a heat source to be cooled, said refrigeration system comprising:
   a heat dissipation device mounted in the equipment and including a heat absorbing portion, absorbing heat from the heat source, and
   a heat dissipation portion disposed so as to release the heat absorbed from the heat source to an environment external to the equipment,
   wherein the heat dissipation portion is accessible through the exterior of the equipment and further comprises an auxiliary refrigeration circuit, external to the equipment and having: a heat absorbing means to be selectively coupled to the heat dissipation portion, to receive therefrom, by conduction, at least part of the heat received from the heat source and to be dissipated by the heat dissipation portion; and
   a heat dissipation means to release the heat to the environment external to the equipment,
   the heat dissipation device being defined by any one of the system including: heat conduction in a solid medium, heat-pipe, thermosiphon, circulating fluid pumping mechanical vapor compression, in order to transfer heat from the heat absorbing portion to the heat dissipation portion,
   the heat dissipation portion defining at least one heat exchange housing formed, at least in part, by a heat exchange wall, whilst the heat absorbing means comprises at least one plug element formed, at least in part, by an outer heat exchange surface, said plug element being tightly removably fitted in the interior of a respective heat exchange housing, so as to provide the coupling of the heat absorbing means to the heat dissipation portion and to allow heat exchange, by conduction, to occur between the heat exchange wall and the outer heat exchange surface of said parts, the heat exchange housing being an elongated hole provided in a body made of a high thermal conductivity material and which is thermally connected to the heat dissipation portion, the heat exchange wall of said elongated hole tightly surrounding and contacting the heat exchange surface of the plug element when the latter is fitted in the interior of the elongated hole, the auxiliary refrigeration circuit being provided in an interior of a compact casing, the auxiliary refrigeration circuit being a refrigeration circuit containing a working fluid to thermally connect the heat absorbing means to the heat dissipation means and the auxiliary refrigeration circuit being refrigeration circuit by mechanical compression of a refrigerant fluid including: a compressor; a condenser defining the heat dissipation means, receiving refrigerant fluid from the compressor and releasing it to an expansion device and, subsequently, to an evaporator defined by the plug element of the heat absorbing means, and the plug element being defined by a refrigerant fluid tube having an inlet end and an outlet end and longitudinally and internally comprising a plurality of peripheral channels and a central channel, a first end of the peripheral channels being connected to the inlet end of the refrigerant fluid tube, whilst a second end of the peripheral channels is open to a first end of the central channel, a second end of the central channel being open to the outlet end of the refrigerant fluid tube.

2. The refrigeration system, as set forth in claim 1, characterized in that the heat dissipated by the heat dissipation portion and not absorbed by the heat absorbing means, is dissipated, to the environment external to the equipment, by at least one of the thermal energy transfer modes defined by radiation, by natural convection and by forced air-flow convection.

3. The refrigeration system, as set forth in claim 2, characterized in that it comprises a fan provided internally to the equipment and which dissipates the heat not absorbed by the heat absorbing means, by forced air-flow convection.

4. The refrigeration system, as set forth in claim 1, characterized in that the equipment comprises at least one window open outwardly from the latter, with the heat dissipation portion incorporating fins disposed adjacent to said window of the equipment.

5. The refrigeration system, as set forth in claim 1, characterized in that the first end of the peripheral channels is open to the interior of a tubular head attached to the body and presenting a nozzle which defines the inlet end of the refrigerant fluid tube.

6. The refrigeration system, as set forth in claim 5, characterized in that the second end of the central channel projects through the tubular head, outwardly from the latter.

7. The refrigeration system, as set forth in claim 1, characterized in that the second end of the peripheral channels is open to the interior of a portion of tubular casing, with a closed end and an open end attached against the body.

8. The refrigeration system, as set forth in claim 7, characterized in that the tubular casing is surrounded by an end portion of the body.

9. The refrigeration system, as set forth in claim 8, characterized in that one of the parts of tubular casing and central channel carries an axial tubular hub having an end connected to the first end of the central channel and a second end provided with a radial opening turned to the interior of the tubular casing.

10. The refrigeration system, as set forth in claim 1, characterized in that the body, provided with the elongated hole which defines the heat exchange housing is thermally connected to the heat dissipation portion through at least one heat conduct containing circulating fluid.

11. The refrigeration system, as set forth in claim 5, characterized in that the heat dissipation device is defined by a primary refrigeration circuit comprising a primary evaporator which defines the heat absorbing portion, and a primary condenser which defines the heat dissipation portion and which is thermally connected to the heat absorbing portion, by at least one heat conduct which receives, by an inlet end, a circulating fluid, which is vaporized in the primary evaporator and which releases, in an outlet end and back to the primary evaporator, the circulating fluid.

12. The refrigeration system, as set forth in claim 11, characterized in that the body presents a pair of cradles, each presenting a thermal contact surface against which is seated and retained a corresponding portion of the outer surface of the heat conduct, said cradles being spaced from each other and from the elongated hole by portions of the body.

13. The refrigeration system, as set forth in claim 12, characterized in that the cradles are defined by respective elongated channels.

* * * * *

UNITED STATES PATENT AND TRADEMARK OFFICE
CERTIFICATE OF CORRECTION

| | | |
|---|---|---|
| PATENT NO. | : 8,713,956 B2 | Page 1 of 1 |
| APPLICATION NO. | : 13/262338 | |
| DATED | : May 6, 2014 | |
| INVENTOR(S) | : Paulo Rogerio Carrara Couto et al. | |

It is certified that error appears in the above-identified patent and that said Letters Patent is hereby corrected as shown below:

In the Claims:

In Claim 1:

Column 12, line 60, "system" should be deleted and --systems-- should be inserted.

Column 12, line 61, insert --and-- after "pumping".

Column 13, line 21, insert --a-- after "being".

Signed and Sealed this
Twenty-second Day of July, 2014

Michelle K. Lee
*Deputy Director of the United States Patent and Trademark Office*